US009276260B2

(12) United States Patent
Jung et al.

(10) Patent No.: US 9,276,260 B2
(45) Date of Patent: Mar. 1, 2016

(54) ANODE ACTIVE MATERIAL FOR LITHIUM SECONDARY BATTERY, LITHIUM SECONDARY BATTERY COMPRISING THE SAME, AND METHOD OF PREPARING THE SAME

(71) Applicant: LG Chem. Ltd., Seoul (KR)

(72) Inventors: Dong-Sub Jung, Daejeon (KR); Byung-Hun Oh, Daejeon (KR); Je-Young Kim, Daejeon (KR); Jae-Wook Lee, Daejeon (KR); Su-Jin Park, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/427,365

(22) PCT Filed: Jun. 13, 2014

(86) PCT No.: PCT/KR2014/005215
§ 371 (c)(1),
(2) Date: Mar. 11, 2015

(87) PCT Pub. No.: WO2014/204141
PCT Pub. Date: Dec. 24, 2014

(65) Prior Publication Data
US 2015/0236340 A1    Aug. 20, 2015

(30) Foreign Application Priority Data

Jun. 19, 2013   (KR) .................. 10-2013-0070602
Jun. 13, 2014   (KR) .................. 10-2014-0072057

(51) Int. Cl.
*H01M 4/133*    (2010.01)
*H01M 4/134*    (2010.01)
(Continued)

(52) U.S. Cl.
CPC .............. *H01M 4/364* (2013.01); *H01M 4/049* (2013.01); *H01M 4/48* (2013.01); *H01M 4/583* (2013.01); *H01M 4/60* (2013.01); *H01M 10/052* (2013.01); *H01M 2004/027* (2013.01)

(58) Field of Classification Search
None
See application file for complete search history.

(56) References Cited

U.S. PATENT DOCUMENTS

2002/0164479 A1   11/2002   Matsubara et al.
2005/0233213 A1   10/2005   Lee et al.
(Continued)

FOREIGN PATENT DOCUMENTS

JP   2010118330 A     5/2010
KR   20020070764 A    9/2002
(Continued)

OTHER PUBLICATIONS

International Search Report for Application No. PCT/KR2014/005215 dated Oct. 28, 2014.

*Primary Examiner* — Cynthia K Walls
(74) *Attorney, Agent, or Firm* — Lerner, David, Littenberg, Krumholz & Mentlik, LLP

(57) ABSTRACT

The present disclosure relates to an anode active material for a lithium secondary battery, a lithium secondary battery comprising the anode active material, and a method of preparing the anode active material. One embodiment of the present disclosure provides an anode active material for a lithium secondary battery, comprising a composite of $SiO_x$-carboxylmethyl cellulose (CMC)-carbon nanotube (CNT) in which CNT is bonded to $SiO_x$ ($0<x\leq1$) through CMC; and a carbon-based material. Also, another embodiment of the present disclosure provides a method of preparing an anode active material for a lithium secondary battery, comprising bringing $SiO_x$ ($0<x\leq1$) into surface-treatment with carbon nanotube (CNT) and carboxylmethyl cellulose (CMC) to form a composite of $SiO_x$-CMC-CNT; and mixing the composite of $SiO_x$-CMC-CNT with a carbon-based material.

10 Claims, 1 Drawing Sheet

(51) Int. Cl.

| | | |
|---|---|---|
| *H01M 4/36* | (2006.01) | |
| *H01M 4/48* | (2010.01) | |
| *H01M 4/60* | (2006.01) | |
| *H01M 4/583* | (2010.01) | |
| *H01M 10/052* | (2010.01) | |
| *H01M 4/04* | (2006.01) | |
| *H01M 4/02* | (2006.01) | |

(56) References Cited

U.S. PATENT DOCUMENTS

2007/0202403 A1  8/2007  Oh et al.
2008/0193831 A1*  8/2008  Mah et al. .................... 429/122
2013/0071741 A1  3/2013  Ohara et al.
2013/0244106 A1  9/2013  Chang et al.

FOREIGN PATENT DOCUMENTS

| KR | 20050090218 A | 9/2005 |
| KR | 20060087003 A | 8/2006 |
| KR | 20070027438 A | 3/2007 |
| KR | 20120093764 A | 8/2012 |
| TW | 201214846 | 4/2012 |
| TW | 201236249 | 9/2012 |

* cited by examiner

ANODE ACTIVE MATERIAL FOR LITHIUM SECONDARY BATTERY, LITHIUM SECONDARY BATTERY COMPRISING THE SAME, AND METHOD OF PREPARING THE SAME

CROSS-REFERENCE TO RELATED APPLICATION

This application is a national phase entry under 35 U.S.C. §371 of International Application No. PCT/KR2014/005215, filed Jun. 13, 2014, which claims priority to Korean Patent Application No. 10-2013-0070602, filed Jun. 19, 2013 and Korean Patent Application No. 10-2014-0072057, filed Jun. 13, 2014, the disclosures of which are incorporated herein by reference.

TECHNICAL FIELD

The present disclosure relates to an anode active material for a lithium secondary battery, more specifically an anode active material for a lithium secondary battery, comprising a composite of $SiO_x$-carboxylmethyl cellulose (CMC)-carbon nanotube (CNT); a lithium secondary battery using the anode active material; and a method of preparing the anode active material.

BACKGROUND ART

Recently, there has been an increasing interest in energy storage technology. Electrochemical devices have been widely used as energy sources in the fields of cellular phones, camcorders, notebook computers, PCs and electric cars, resulting in intensive research and development into them.

In this regard, electrochemical devices are one of the subjects of great interest. Particularly, development of rechargeable secondary batteries has been the focus of attention. Recently, research and development of such batteries are focused on the designs of new electrodes and batteries to improve capacity density and specific energy.

Many secondary batteries are currently available. Among these, lithium secondary batteries developed in the early 1990's have drawn particular attention due to their advantages of higher operating voltages and much higher energy densities than conventional aqueous electrolyte-based batteries, for example, Ni-MH, Ni—Cd, and $H_2SO_4$—Pb batteries.

Generally, a lithium secondary battery is prepared by using a cathode and an anode which are each made of a material capable of intercalating and disintercalating lithium ions, and filling an organic or polymer electrolyte solution between the cathode and the anode, and the battery produces electrical energy by oxidation and reduction when the lithium ions are intercalated and disintercalated in the cathode and the anode.

In lithium secondary batteries which are currently available, an anode is mostly made of carbon-based materials as an electrode active material. Particularly, graphite which has been commercially available has a real capacity of about 350 to 360 mAh/g which approaches its theoretical capacity of about 372 mAh/g. Although a carbon-based material such as graphite has a capacity of such a degree, it does not meet the demand for high-capacity lithium secondary batteries as an anode active material.

In order to meet such a demand, attempts have been made to use metals as an anode active material, for example, Si, Sn, an oxide and an alloy thereof, that have a higher charge/discharge capacity than the carbon materials and allow electrochemical alloying with lithium. However, this metal-based electrode active material has a great change in volume during charging/discharging, which may cause cracks and micronization to the active material. Secondary batteries using this metal-based anode active material may suddenly be deteriorated in capacity and have reduced cycle life during repeated charging/discharging cycles. Accordingly, there is a need for solving the deterioration of capacity and cycle life by the use of such a metal-based electrode active material.

In particular, SiO is conventionally used by mixing it with graphite and dispersing a conductive material to the mixture as it has low initial efficiency, electric conductivity and life characteristic. However, the conductive material is not uniformly distributed on the surface of SiO due to its poor dispersity, and such an ununiform distribution may greatly deteriorate the cycle performance of batteries. In order to solve this problem, there is an attempt of pre-treating carbon nanotube (CNT) on the surface of SiO to improve the life characteristic of batteries, but the CNT has not been well-attached to the surface of SiO.

DISCLOSURE

Technical Problem

The present disclosure is designed to solve the above-mentioned problems, and therefore, it is an object of the present disclosure to provide an anode active material in which CNT is well attached to the surface of SiO to improve the life characteristic of batteries, a lithium secondary battery comprising the anode active material, and a method of preparing the anode active material.

Technical Solution

In order to achieve the object, in accordance with one aspect of the present disclosure, there is provided an anode active material for a lithium secondary battery, comprising a composite of $SiO_x$-carboxylmethyl cellulose (CMC)-carbon nanotube (CNT) in which CNT is bonded to $SiO_x$ ($0<x\leq1$) through CMC; and a carbon-based material.

According to one embodiment of the present disclosure, in the composite of $SiO_x$—CMC-CNT, a weight ratio of $SiO_x$ ($0<x\leq1$), CMC, and CNT may be in the range of 98:1:1 to 94:3:3.

According to one embodiment of the present disclosure, the composite of $SiO_x$—CMC-CNT and the carbon-based material may be present in a weight ratio of 5:95 to 15:85.

According to one embodiment of the present disclosure, the carbon-based material may be any one selected from the group consisting of graphite, graphitizable carbon, non-graphitizable carbon, carbon black, graphene, graphene oxide, and a mixture thereof.

Also, in accordance with another aspect of the present disclosure, there is provided an anode for a lithium secondary battery, comprising a current collector and an anode active material layer formed on at least one surface of the current collector and comprising an anode active material wherein the anode active material is one defined in the present disclosure.

In addition, in accordance with still another aspect of the present disclosure, there is provided a lithium secondary battery, comprising a cathode, an anode, and a separator interposed between the cathode and the anode, wherein the anode is one defined in the present disclosure.

Further, in accordance with yet still another aspect of the present disclosure, there is provided a method of preparing an anode active material for a lithium secondary battery, comprising bringing SiO (0<x≤1) into surface-treatment with carbon nanotube (CNT) and carboxylmethyl cellulose (CMC) to form a composite of $SiO_x$-CMC-CNT; and mixing the composite of $SiO_x$-CMC-CNT with a carbon-based material.

In a preferred embodiment of the present disclosure, the step of forming the composite of $SiO_x$-CMC-CNT may comprise (S1) adding and mixing SiO (0<x≤1) to a solvent; (S2) adding and mixing CNT and CMC to the $SiO_x$-containing solution; and (S3) bringing the solution containing $SiO_x$, CNT and CMC into rotary evaporation to remove the used solvent to obtain a composite of $SiO_x$-CMC-CNT.

According to one embodiment of the present disclosure, SiO (0<x≤1), CMC, and CNT may be used in a weight ratio of 98:1:1 to 94:3:3.

According to one embodiment of the present disclosure, the composite of $SiO_x$-CMC-CNT and the carbon-based material may be used in a weight ratio of 5:95 to 15:85.

Advantageous Effects

The anode active material and the lithium secondary battery of the present disclosure provide enhanced battery capacity, as well as improved life characteristics as compared with those having SiO surface-treated with only carbon nanotube.

DESCRIPTION OF THE DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

BEST MODE

Figure 1:
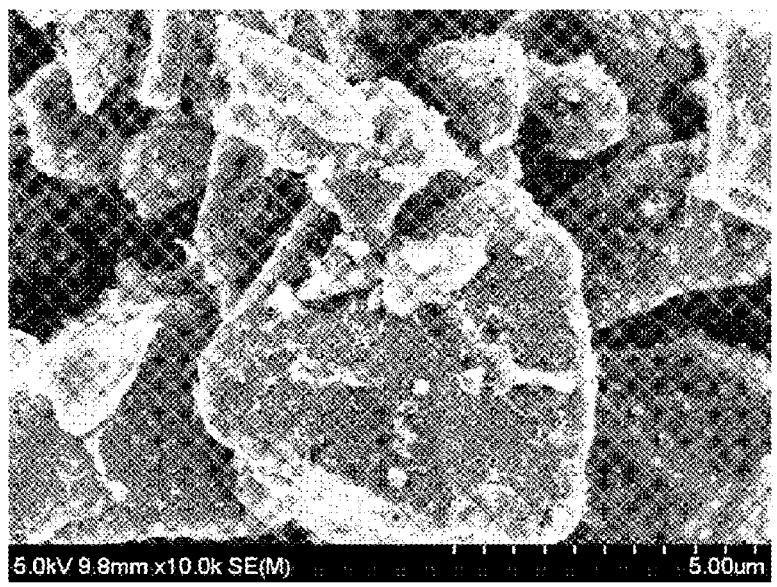
FIG. 1 is a scanning electron microscope (SEM) photograph for a composite of SiO-CMC-CNT according to one embodiment of the present disclosure.

Hereinafter, the present disclosure will be described in detail. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the embodiments and the drawings proposed herein are just a preferable example for the purpose of illustrations only, not intended to limit the scope of the disclosure, so it should be understood that other equivalents and modifications could be made thereto without departing from the spirit and scope of the disclosure.

In the case that conventional silicon-based particles are used as an anode active material, these particles are subject to volume change while lithium is charged and discharged, and thus may be cracked and micronized. For this reason, secondary batteries using such an anode active material may suddenly be deteriorated in capacity and have reduced cycle life during repeated charging/discharging cycles. In order to solve such a problem, an attempt has been made to use the silicon-based material by mixing it with a carbon-based material and a conductive material. However, the conductive material is not uniformly distributed on the surface of SiO to deteriorate the cycle performance of batteries. Also, there is another attempt of pre-treating carbon nanotube (CNT) on the surface of SiO to improve the life characteristic of batteries, but the CNT has not been well-attached to the surface of SiO.

Accordingly, the present inventors have endeavored to develop a method for securely bonding CNT to the surface of SiO (0<x≤1) to improve the life characteristic of batteries more effectively and found that carboxylmethyl cellulose (CMC) can be used to allow for CNT to be well-attached to the surface of the surface of SiO (0<x≤1), thereby improving the life characteristic.

The anode active material of the present disclosure comprises a composite of $SiO_x$-carboxylmethyl cellulose (CMC)-carbon nanotube (CNT) in which CNT is bonded to $SiO_x$ (0<x≤1) through CMC; and a carbon-based material.

The $SiO_x$-CMC-CNT composite of the present disclosure may include various combinations of $SiO_x$, CMC, and CNT to achieve the object thereof. The CMC has binding ability and can effectively disperse CNT without causing a side reaction, such as gas generation, during charging and discharging. In contrast, in the case that a styrene-butadiene rubber (SBR) is used to form a composite of $SiO_x$-SBR-CNT, it has been found that CNT is agglomerated without being dispersed on the surface of SiO because the SBR has binding ability, but no dispersibility. That is, it has been confirmed that the object of the present disclosure can be achieved from the combinations of $SiO_x$-CMC-CNT in which CNT is uniformly dispersed on the surface of SiO and well-attached thereto by virtue of the good dispersion and suitable binding ability of CMC.

In the present disclosure, the carbon nanotube (CNT) is not particularly limited, and may be largely categorized as single-walled carbon nanotubes (SWCNTs) and multi-walled carbon nanotubes (MWCNTs).

In the composite of $SiO_x$-CMC-CNT, a weight ratio of SiO (0<x≤1):CMC:CNT may be in the range of 98:1:1 to 94:3:3. When the composite of $SiO_x$-CMC-CNT satisfies such weight ratio range, the CMC can maintain a secure binding between SiO and CNT, and thus anode active materials such a composite can have improved life characteristics. More specifically, if the ratio of CNT is less than such range, life characteristics become poor, and if the ratio of CNT is greater than such range, initial efficiency becomes low. Also, if the ratio of CMC is less than such range, life characteristics may be poor due to weak bonding between SiO and CNT, and if the ratio of CMC is greater than such range, the CMC itself may act as a resistance to lower life characteristics. Thus, in order to achieve the object of the present disclosure, it is preferable to satisfy such weight ratio range for each component in the composite of $SiO_x$-CMC-CNT. More preferably, in the composite of $SiO_x$-CMC-CNT, CNT and CMC has a weight ratio of 1:1.

The composite of $SiO_x$-CMC-CNT and the carbon-based material may be present in a weight ratio of 5:95 to 15:85. When the anode active material comprises the composite and the carbon-based material in such weight ratio, the volume expansion of the anode active material may be substantially reduced, thereby surprisingly improving cycle and life characteristics. More specifically, if the amount of the $SiO_x$-CMC-CNT composite is less than such range, capacity becomes low, and if the amount thereof is greater than such range, high capacity may be obtained but poor life characteristic may be incurred. Therefore, in order to achieve the object of the present disclosure, it is preferable to satisfy such weight ratio range for the composite of $SiO_x$-CMC-CNT and the carbon-based material.

Non-limiting examples of the carbon-based material which may be used in the present disclosure include graphite, graphitizable carbon (also called 'soft carbon'), non-graphitizable carbon (also called 'hard carbon'), carbon black, graphene, graphene oxide, and a mixture thereof. Specifically, examples of the graphite may include natural graphite, artificial graphite, e.g., mesophase carbon microbead (MCMB) and mesophase pitch-based carbon fiber (MPCF). Also, examples of the carbon black may include ketjen black, acetylene black, channel black, furnace black, thermal black, Lamp black, Ivory black, and Vine black.

Figure 2:
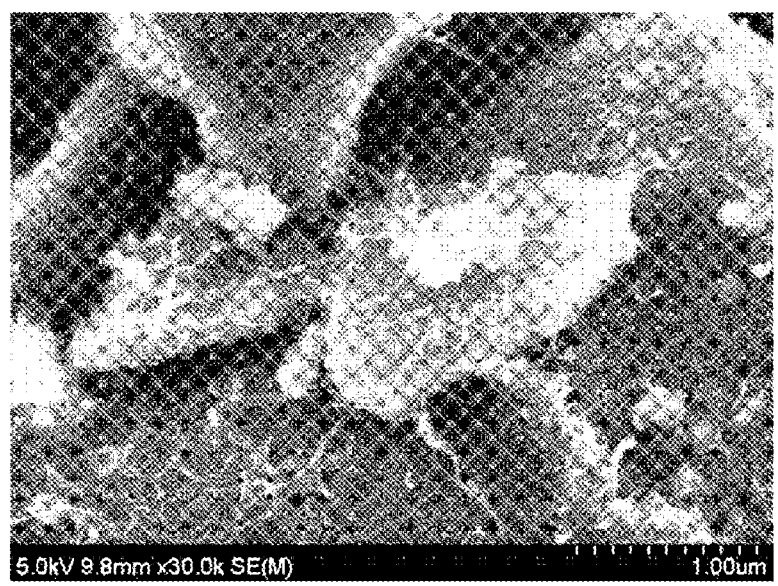
FIG. 2 is an expanded view of FIG. 1

FIGS. 1 and 2 show an anode active material, comprising the SiO-CMC-CNT composite of the present disclosure in which CNT is uniformly dispersed on the surface of SiO.

The anode active material thus prepared can be used in an anode according to a conventional method known in the art. Also, in the present disclosure, a cathode may be prepared by a conventional method known in the art, similar to the anode. For example, the anode active material of the present disclosure is mixed with a binder, a solvent, and optionally a conducting material and a dispersing agent while stirring, to produce a slurry, and applying the slurry on a current collector, followed by compression, to prepare an electrode.

Therefore, the present disclosure provides an anode for a lithium secondary battery, comprising a current collector and an anode active material layer formed on at least one surface of the current collector and comprising an anode active material wherein the anode active material is one defined in the present disclosure.

The binder which may be used in the present disclosure includes various kinds of binder polymers including vinylidenefluoride-hexafluoropropylene copolymer (PVDF-co-HFP), polyvinylidenefluoride, polyacrylonitrile, and polymethylmethacrylate.

A cathode active material which may be used in the present disclosure preferably includes a lithium-containing transition metal oxide, for example, any one selected from the group consisting of $Li_xCoO_2$ (0.5<x<1.3), $Li_xNiO_2$ (0.5<x<1.3), $Li_xMnO_2$ (0.5<x<1.3), $Li_xMn_2O_4$ (0.5<x<1.3), $Li_x(Ni_aCo_bMn_c)O_2$ (0.5<x<1.3, 0<a<1, 0<b<1, 0<c<1, a+b+c=1), $Li_xNi_{1-y}Co_yO_2$ (0.5<x<1.3, 0<y<1), $Li_xCo_{1-y}Mn_yO_2$ (0.5<x<1.3, 0≤y<1), $Li_xNi_{1-y}Mn_yO_2$ (0.5<x<1.3, O≤y<1), $Li_x(Ni_aCo_bMn_c)O_4$ (0.5<x<1.3, 0≤a<2, 0<b<2, 0<c<2, a+b+c=2), $Li_xMn_{2-z}Ni_zO_4$ (0.5<x<1.3, 0<z<2), $Li_xMn_{2-z}CO_zO_4$ (0.5<x<1.3, 0<z<2), $Li_xCoPO_4$ (0.5<x<1.3), $Li_xFePO_4$ (0.5<x<1.3), and a mixture thereof. The lithium-containing transition metal oxide may be coated with a metal such as Al or a metal oxide. In addition, lithium-containing transition metal sulfide, selenide, or halide may also be used.

After the electrode is prepared, a conventional lithium secondary battery including the cathode, the anode, a separator interposed between the cathode and the anode, and an electrolyte solution may be prepared.

Therefore, the present disclosure provides a lithium secondary battery, comprising a cathode, the above-mentioned anode, and a separator interposed between the cathode and the anode.

The electrolyte solution used in the present disclosure comprises a lithium salt as an electrolyte salt. The lithium salt may be any one which is conventionally used in an electrolyte solution for a lithium secondary battery. For example, an anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The electrolyte solution used in the present disclosure comprises an organic solvent which is conventionally used in an electrolyte solution for a lithium secondary battery, for example, propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethylsulfoxide, acetonitrile, dimethoxyethane, diethoxyethane, vinylene carbonate, sulforane, γ-buryrolactone, propylene sulfite, and tetrahydrofuran and a mixture thereof. In particular, among the above carbonate-based organic solvents, ethylene carbonate and propylene carbonate that are cyclic carbonates are preferred, since they have high viscosity and consequently a high dielectric constant to easily dissociate the lithium salt in the electrolyte. More preferably, such a cyclic carbonate is used as a mixture with a linear carbonate having a low viscosity and a low dielectric constant, such as dimethyl carbonate and diethyl carbonate in a suitable ratio, to provide an electrolyte having a high electric conductivity.

Optionally, the electrolyte solution used in the present disclosure may further include an additive, such as an overcharge inhibitor which is conventionally used in an electrolyte.

Also, the separator which may be used in the present disclosure includes a single-layered or multi-layered porous polymer film conventionally used as a separator, and a porous non-woven fabric conventionally used as a separator, and the like. The porous polymer film may be made of polyolefin-based polymer, for example, ethylene homopolymer, propylene homopolymer, ethylene/butene copolymer, ethylene/hexene copolymer, and ethylene/methacrylate copolymer, and the porous non-woven fabric may be made of, for example, high-melting glass fibers, polyethylene terephthalate fibers, and the like. However, the present disclosure is not limited thereto.

A battery case used in the present disclosure may be any one conventionally used in the art, and the shape of the battery case is not particularly limited depending on its uses. For example, the shape of the battery case may be cylindrical, prismatic, pouch, or coin.

Further, in accordance with yet still another aspect of the present disclosure, there is provided a method of preparing an anode active material for a lithium secondary battery, comprising bringing $SiO_x$ (0<x≤1) into surface-treatment with carbon nanotube (CNT) and carboxylmethyl cellulose (CMC) to form a composite of $SiO_x$-CMC-CNT; and mixing the composite of $SiO_x$-CMC-CNT with a carbon-based material.

Also, the step of forming the composite of $SiO_x$-CMC-CNT may comprise (S1) adding and mixing $SiO_x$ (0<x≤1) to a solvent; (S2) adding and mixing CNT and CMC to the $SiO_x$-containing solution; and (S3) bringing the solution containing $SiO_x$, CNT and CMC into rotary evaporation to remove the used solvent to obtain a composite of $SiO_x$-CMC-CNT. The solvent used herein may be water since carboxylmethyl cellulose (CMC) is water-soluble, but the present disclosure is not limited thereto.

As already mentioned on the anode active material, a weight ratio of $SiO_x$ (0<x≤1), CMC, and CNT may be in the range of 98:1:1 to 94:3:3. Also, a weight ratio of the composite of $SiO_x$-CMC-CNT and the carbon-based material may be in the range of 5:95 to 15:85.

Hereinafter, the present disclosure will be described in detail through specific examples. However, the description proposed herein is just a preferable example for the purpose of illustrations only, not intended to limit the scope of the invention, so it should be understood that the examples are provided for a more definite explanation to an ordinary person skilled in the art.

Example 1

Step 1: Preparation of Anode Active Material 98 g of SiO was added to 400 g of water used as a solvent and sufficiently mixed with each other for 30 minutes, to which 1 g of carbon nanotube (CNT) and 1 g of carboxylmethyl cellulose (CMC) were added and sufficiently mixed for 1 hour. The resulting solution containing SiO, CNT and CMC was put in a 2 L round-bottomed flask and brought into rotary evaporation to remove the solvent used. Thereby, a solvent-removed composite of SiO-CMC-CNT was obtained. The solvent-removed composite of SiO-CMC-CNT was dried in an oven under vacuum at 130° C. for 10 hours, followed by pulverization in a mortar, to obtain 95 g of a pulverized composite of SiO-CMC-CNT.

The composite of SiO-CMC-CNT thus obtained was analyzed with a scanning electron microscope (SEM), and the SEM image thereof shows that CNT was well-attached to the surface of SiO (see FIGS. 1 and 2).

Step 2: Preparation of Anode

An anode active material comprising the SiO-CMC-CNT composite prepared above, denka black as a conductive material, styrene-butadiene rubber (SBR) as a binder, and carboxylmethyl cellulose (CMC) as a thickener were mixed in a weight ratio of 96.8:1:1:1.2, to which water was added, to obtain a slurry. The obtained slurry was coated on a copper foil used as an anode current collector, dried under vacuum at 130° C. for 10 hours, to obtain an anode having a size of 1,4875 cm$^2$.

Step 3: Preparation of Secondary Battery

Metallic lithium foil having a size of 1.8 cm$^2$ was used as a cathode, and a polyolefin separator was interposed between the anode and the cathode, to obtain an electrode assembly. Ethylene carbonate (EC) and diethyl carbonate (DEC) were mixed at a ratio of 1:2 (vol %), to which LiPF$_6$ were added, to obtain 1M LiPF$_6$ of non-aqueous electrolyte solution. Then, the electrolyte solution was introduced in the electrode assembly, to prepare a coin-type half-cell.

Example 2

The procedures of Example 1 were repeated except that 2 g of CNT and 2 g of CMC were added to 96 g of SiO to obtain a composite of SiO-CMC-CNT, and the SiO-CMC-CNT composite was used as an anode active material, to prepare a coin-type half-cell.

Example 3

The procedures of Example 1 were repeated except that 3 g of CNT and 3 g of CMC were added to 94 g of SiO to obtain a composite of SiO-CMC-CNT, and the SiO-CMC-CNT composite was used as an anode active material, to prepare a coin-type half-cell.

Comparative Example 1

The procedures of Example 1 were repeated except that CNT and CMC were not bonded to SiO used as an anode active material, to prepare a secondary battery.

Comparative Example 2

The procedures of Example 1 were repeated except that a mixture of SiO and graphite (10:90 (wt/wt)) as an anode active material, CNT and denka black as a conductive material, SBR as a binder, and CMC as a thickener were mixed in a weight ratio of 96.0:0.2:1:1:1.2 (anode active material: CNT:DB:SBR:CMC), to prepare a secondary battery.

Comparative Example 3

The procedures of Example 1 were repeated except that 1 g of CNT was added to 99 g of SiO to obtain a composite of SiO-CNT, and the SiO-CNT composite was used as an anode active material, to prepare a coin-type half-cell.

Comparative Example 4

The procedures of Example 1 were repeated except that 1 g of CMC was added to 99 g of SiO to obtain a composite of SiO-CMC, and the SiO-CMC composite was used as an anode active material, to prepare a coin-type half-cell.

Comparative Example 5

The procedures of Example 1 were repeated except that 0.5 g of CNT and 0.5 g of CMC were added to 99 g of SiO to obtain a composite of SiO-CMC-CNT, and the SiO-CMC-CNT composite was used as an anode active material, to prepare a coin-type half-cell.

Comparative Example 6

The procedures of Example 1 were repeated except that 4 g of CNT and 4 g of CMC were added to 92 g of SiO to obtain a composite of SiO-CMC-CNT, and the SiO-CMC-CNT composite was used as an anode active material, to prepare a coin-type half-cell.

Comparative Example 7

A composite of SiO-CMC-CNT was prepared by the same procedures of Example 3, and then the procedures of Example 1 were repeated except that the SiO-CMC-CNT composite was mixed with graphite in the weight ratio of 3:97 and the mixture was used as an anode active material, to prepare a coin-type half-cell.

Comparative Example 8

A composite of SiO-CMC-CNT was prepared by the same procedures of Example 3, and then the procedures of Example 1 were repeated except that the SiO-CMC-CNT composite was mixed with graphite in the weight ratio of 20:80 and the mixture was used as an anode active material, to prepare a coin-type half-cell.

The anode active material, the conductive material, the binder and the thickener used in Examples 1 to 3 and Comparative Examples 1 to 8, their weight ratio, and the amount of CNT in the prepared anode are shown in Table 1.

TABLE 1

|  | Anode active material | | Conductive material (weight ratio) | Binder (weight ratio) | Thickener (weight ratio) | Amount of CNT in Anode (wt %) |
|---|---|---|---|---|---|---|
|  | Kinds | Amount (weight ratio) |  |  |  |  |
| Example 1 | (SiO-CNT-CMC) + graphite | SiO:CNT:CMC = 98:1:1 (SiO + CNT + CMC):graphite = 10:90 Anode active material = 96.8 | DB = 1 | SBR = 1 | CMC = 1.2 | 0.097 |
| Example 2 | (SiO-CNT-CMC) + graphite | SiO:CNT:CMC = 96:2:2 (SiO + CNT + CMC):graphite = 10:90 Anode active material = 96.8 | DB = 1 | SBR = 1 | CMC = 1.2 | 0.194 |
| Example 3 | (SiO-CNT-CMC) + graphite | SiO:CNT:CMC = 94:3:3 (SiO + CNT + CMC):graphite = 10:90 Anode active material = 96.8 | DB = 1 | SBR = 1 | CMC = 1.2 | 0.29 |
| Com. Ex. 1 | SiO + graphite | SiO:graphite = 10:90 Anode active material = 96.8 | DB = 1 | SBR = 1 | CMC = 1.2 | 0 |
| Com. Ex. 2 | SiO + graphite | SiO:graphite = 10:90 Anode active material = 96.6 | CNT:DB = 0.2:1 | SBR = 1 | CMC = 1.2 | 0.2 |
| Com. Ex. 3 | (SiO-CNT) + graphite | SiO:CNT = 99:1 (SiO + CNT + CMC):graphite = 10:90 Anode active material = 96.8 | DB = 1 | SBR = 1 | CMC = 1.2 | 0.097 |
| Com. Ex. 4 | (SiO-CMC) + graphite | SiO:CMC = 99:1 (SiO + CMC):graphite = 10:90 Anode active material = 96.8 | DB = 1 | SBR = 1 | CMC = 1.2 | 0 |
| Com. Ex. 5 | (SiO-CNT-CMC) + graphite | SiO:CNT:CMC = 99:0.5:0.5 (SiO + CNT + CMC):graphite = 10:90 Anode active material = 96.8 | DB = 1 | SBR = 1 | CMC = 1.2 | 0.048 |
| Com. Ex. 6 | (SiO-CNT-CMC) + graphite | SiO:CNT:CMC = 92:4:4 (SiO + CNT + CMC):graphite = 10:90 Anode active material = 96.8 | DB = 1 | SBR = 1 | CMC = 1.2 | 0.39 |
| Com. Ex. 7 | (SiO-CNT-CMC) + graphite | SiO:CNT:CMC = 94:3:3 (SiO + CNT + CMC):graphite = 3:97 Anode active material = 96.8 | DB = 1 | SBR = 1 | CMC = 1.2 | 0.29 |
| Com. Ex. 8 | (SiO-CNT-CMC) + graphite | SiO:CNT:CMC = 94:3:3 (SiO + CNT + CMC):graphite = 20:80 Anode active material = 96.8 | DB = 1 | SBR = 1 | CMC = 1.2 | 0.29 |

The batteries prepared in Examples 1 to 3 and Comparative Examples 1 to 8 were evaluated for their capacity, initial efficiency and capacity retention, and the results thereof are shown in Table 2.

TABLE 2

|  | First Discharge Capacity (mAh/g) | Initial Efficiency (%) | Capacity Retention (%) |
|---|---|---|---|
| Example 1 | 475 | 88.2 | 97 |
| Example 2 | 474 | 88.1 | 97 |
| Example 3 | 472 | 88.0 | 98 |
| Com. Ex. 1 | 473 | 88.3 | 80 |
| Com. Ex. 2 | 473 | 88.2 | 81 |
| Com. Ex. 3 | 474 | 88.2 | 94 |
| Com. Ex. 4 | 474 | 83.4 | 82 |
| Com. Ex. 5 | 475 | 88.3 | 84 |
| Com. Ex. 6 | 469 | 87.5 | 78 |
| Com. Ex. 7 | 390 | 90.0 | 97 |
| Com. Ex. 8 | 590 | 81.0 | 65 |

Initial Efficiency = (First Discharge Capacity)/(First Charge Capacity) × 100
Capacity Retention = ($50^{th}$ Discharge Capacity)/(First Discharge Capacity) × 100

As can be seen in Table 2, the batteries of Examples 1 to 3 according to the present disclosure exhibited the almost similar capacity and initial efficiency to those of Comparative Examples 1 to 4, and the capacity retention ratio thereof was very superior than those of Comparative Examples 1 to 4. Also, Comparative Example 5, in which the amount of CNT in the SiO$_x$-CMC-CNT composite was low, exhibited poor life characteristic, and Comparative Example 6, in which the ratio of CMC and CNT in the SiO$_x$-CMC-CNT composite was high, exhibited low initial efficiency and poor life characteristic. In addition, Comparative Example 7, in which the ratio of the SiO$_x$-CMC-CNT composite in the anode active material was low, exhibited low capacity, and Comparative Example 8, in which the ratio of the SiO$_x$-CMC-CNT composite in the anode active material was high, exhibited high capacity but very low capacity retention.

What is claimed is:

1. An anode active material for a lithium secondary battery, comprising a composite of SiO$_x$-carboxylmethyl cellulose (CMC)-carbon nanotube (CNT) in which CNT is bonded to SiO$_x$ (0<x≤1) through CMC; and a carbon-based material.

2. The anode active material for a lithium secondary battery of claim 1, wherein a weight ratio of SiO$_x$ (0<x≤1), CMC, and CNT in the composite of SiO$_x$-CMC-CNT is in the range of 98:1:1 to 94:3:3.

3. The anode active material for a lithium secondary battery of claim 1, wherein the composite of SiO$_x$-CMC-CNT and the carbon-based material are present in a weight ratio of 5:95 to 15:85.

4. The anode active material for a lithium secondary battery of claim 1, wherein the carbon-based material is any one selected from the group consisting of graphite, graphitizable carbon, non-graphitizable carbon, carbon black, graphene, graphene oxide, and a mixture thereof.

5. An anode for a lithium secondary battery, comprising a current collector; and an anode active material layer formed on at least one surface of the current collector and comprising an anode active material,
wherein the anode active material is defined in claim 1.

6. A lithium secondary battery, comprising a cathode, an anode, and a separator interposed between the cathode and the anode,
wherein the anode is defined in claim 5.

7. A method of preparing an anode active material for a lithium secondary battery, comprising:

bringing $SiO_x$ (0<x≤1) into surface-treatment with carbon nanotube (CNT) and carboxylmethyl cellulose (CMC) to form a composite of $SiO_x$-CMC-CNT; and mixing the composite of $SiO_x$-CMC-CNT with a carbon-based material.

8. The method of claim 7, wherein the step of forming the composite of $SiO_x$-CMC-CNT comprises (S1) adding and mixing $SiO_x$ (0<x≤1) to a solvent; (S2) adding and mixing CNT and CMC to the $SiO_x$-containing solution; and (S3) bringing the solution containing $SiO_x$, CNT and CMC into rotary evaporation to remove the used solvent to obtain a composite of $SiO_x$-CMC-CNT.

9. The method of claim 8, wherein $SiO_x$ (0<x≤1), CMC, and CNT are used in a weight ratio of 98:1:1 to 94:3:3.

10. The method of claim 7, wherein the composite of $SiO_x$-CMC-CNT and the carbon-based material are used in a weight ratio of 5:95 to 15:85.

* * * * *